United States Patent
Kamen et al.

(10) Patent No.: US 7,106,338 B1
(45) Date of Patent: Sep. 12, 2006

(54) METHOD AND SYSTEM FOR OPTIMAL USAGE OF MEMORY FOR STORING SCHEDULING AND GUIDING DATA IN 3D-ENABLED EPG

(75) Inventors: Yakov Kamen, Cupertino, CA (US); Leon Alexander Shirman, Redwood City, CA (US)

(73) Assignee: Eagle New Media Investments, LLC, Chicago, IL (US)

( * ) Notice: Subject to any disclaimer, the term of this patent is extended or adjusted under 35 U.S.C. 154(b) by 823 days.

(21) Appl. No.: 09/691,794

(22) Filed: Oct. 18, 2000

Related U.S. Application Data

(60) Provisional application No. 60/190,327, filed on Mar. 16, 2000.

(51) Int. Cl.
 G06F 12/02 (2006.01)
 G06F 15/167 (2006.01)
 G06T 1/60 (2006.01)
 G06T 9/00 (2006.01)

(52) U.S. Cl. ............... 345/543; 345/530; 345/542; 345/555

(58) Field of Classification Search ........... 345/552, 345/555, 536, 530, 547, 557, 543, 522, 537, 345/542; 725/131, 134
See application file for complete search history.

(56) References Cited

U.S. PATENT DOCUMENTS

| | | | |
|---|---|---|---|
| 4,621,259 A | 11/1986 | Schepers et al. | |
| 5,243,418 A | 9/1993 | Kuno et al. | |
| 5,414,773 A | 5/1995 | Handelman | |
| 5,479,268 A | 12/1995 | Young et al. | |
| 5,485,197 A | 1/1996 | Hoarty | |
| 5,532,754 A | 7/1996 | Young et al. | |
| 5,550,576 A | 8/1996 | Klosterman | |
| 5,684,525 A | 11/1997 | Klosterman | |
| 5,704,837 A | 1/1998 | Iwasaki et al. | |
| 5,724,492 A | 3/1998 | Matthews, III et al. | |
| 5,737,028 A | 4/1998 | Bertram et al. | |
| 5,751,282 A | 5/1998 | Girard et al. | |
| 5,808,613 A | 9/1998 | Marrin et al. | |
| 5,818,441 A | 10/1998 | Throckmorton et al. | |
| 5,828,945 A | 10/1998 | Klosterman | |
| 5,841,563 A | 11/1998 | Effenberger | |
| 5,852,443 A * | 12/1998 | Kenworthy | 345/441 |
| 5,900,915 A | 5/1999 | Morrison | |
| 5,923,362 A | 7/1999 | Klosterman | |
| 5,926,168 A | 7/1999 | Fan | |
| 5,929,849 A | 7/1999 | Kikinis | |
| 5,940,073 A | 8/1999 | Klosterman et al. | |
| 5,956,456 A | 9/1999 | Bang et al. | |

(Continued)

FOREIGN PATENT DOCUMENTS

JP 410093880 A 4/1998

(Continued)

*Primary Examiner*—Ulka Chauhan
*Assistant Examiner*—Joni Hsu
(74) *Attorney, Agent, or Firm*—Todd S. Parkhurst; Holland & Knight LLP

(57) ABSTRACT

A system that can store electronic program guide information using 3D graphics is disclosed. In a particular embodiment, a data filter and a text-to-image converter are used for converting filtered data into a set of digital images that are defined as a set of texture maps. In order to apply those texture maps, a memory analyzer analyzes the set-top box layout and indicates available memory types. The memory analyzer controls a memory distributor for distributing texture maps into the appropriate types of memory.

7 Claims, 1 Drawing Sheet

U.S. PATENT DOCUMENTS

| | | |
|---|---|---|
| 5,977,964 A | 11/1999 | Williams et al. |
| 5,999,167 A | 12/1999 | Marsh et al. |
| 5,999,187 A | 12/1999 | Dehmlow et al. |
| 6,002,403 A | 12/1999 | Sugiyama et al. |
| 6,029,195 A | 2/2000 | Herz |
| 6,043,818 A | 3/2000 | Nakano et al. |
| 6,061,055 A | 5/2000 | Marks |
| 6,072,983 A | 6/2000 | Klosterman |
| 6,075,575 A | 6/2000 | Schein et al. |
| 6,078,348 A | 6/2000 | Klosterman et al. |
| 6,081,271 A | 6/2000 | Bardon et al. |
| 6,167,188 A | 12/2000 | Young et al. |
| 6,205,485 B1 | 3/2001 | Kikinis |
| 6,233,389 B1 | 5/2001 | Barton et al. |
| 6,243,039 B1 | 6/2001 | Elliot |
| 6,266,753 B1 * | 7/2001 | Hicok et al. ................ 711/202 |
| 6,271,831 B1 | 8/2001 | Escobosa et al. |
| 6,300,962 B1 * | 10/2001 | Wishoff et al. ............. 345/543 |
| 6,326,973 B1 * | 12/2001 | Behrbaum et al. .......... 345/532 |
| 2003/0037336 A1 * | 2/2003 | Leftwich ...................... 725/91 |

FOREIGN PATENT DOCUMENTS

| | | |
|---|---|---|
| WO | WO 00/01149 A1 | 1/2000 |

* cited by examiner

Diagrams:
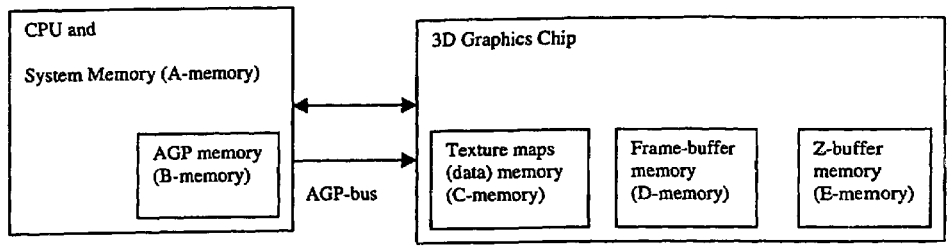
Fig. 1 Memory types and allocation in 3D-enabled electronic devices
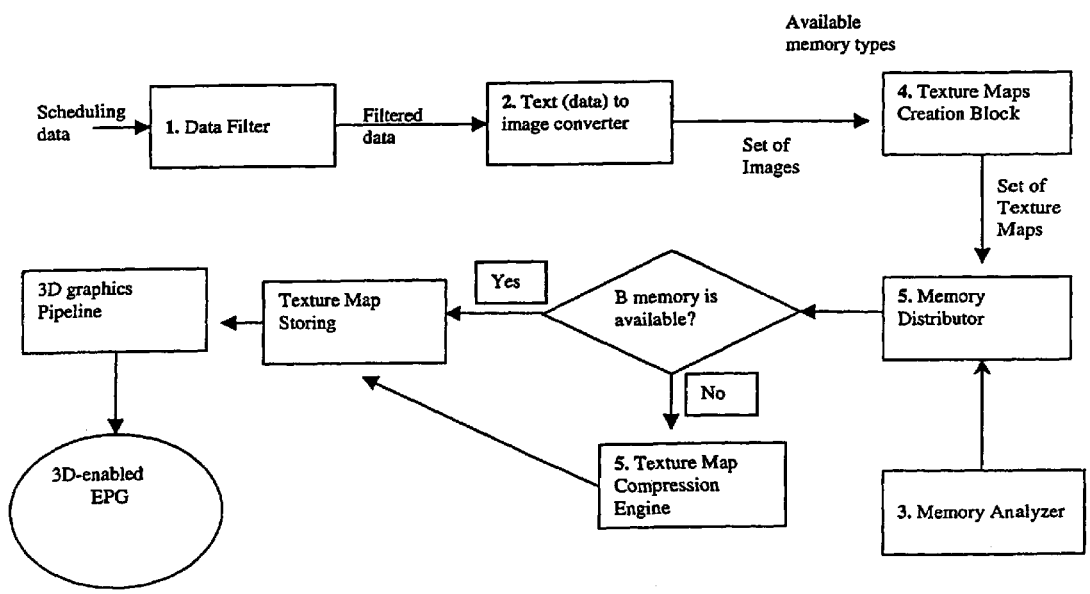
Fig. 2 Mechanism and Apparatus for cost-effective memory management diagram

METHOD AND SYSTEM FOR OPTIMAL USAGE OF MEMORY FOR STORING SCHEDULING AND GUIDING DATA IN 3D-ENABLED EPG

This application claims the benefit of U.S. Provisional Application No. 60/190,327, filed on Mar. 16, 2000, entitled METHOD AND SYSTEM FOR OPTIMAL USEAGE OF MEMORY FOR STORING SCHEDULING AND GUIDING DATA IN 3D-ENABLED EPG.

BACKGROUND OF THE INVENTION

1. Field of the Invention

The invention relates to television electronic programming guides ("EPGs"). More particularly, it relates to a method and apparatus for cost-effective memory management.

2. Description of the Related Art

Prior art EPGs provide television viewers with on-screen television schedule information presented, e.g., in a convenient, regular or non-regular rectangular grid format. One type of EPG is used in conjunction with an analog television system. That type of EPG sometimes is called a passive programming guide ("PPG"). In such a system, one of the cable channels is reserved for displaying programming information. The programming information is displayed in a grid pattern. The first column lists the various channels of the cable broadcast system. Additional columns, e.g., columns two, three and four, display program information for what is showing on the channels listed in the first column, in half-hour increments. For example, suppose that a person tunes to an EPG at 10:35 p.m., the second column would display program information for 10:00–10:30 p.m., the third column would display program information for 10:30–11:00 p.m., and the fourth column would display program information for 11:00 p.m. 11:30 p.m. A row at mid-screen displays the time slots relating to the second, third and fourth columns. A portion of the television ("TV") screen typically provides continuous advertisements.

Cable TV systems typically provide more television channels than there is space for rows in a useable grid pattern. A grid is typically used that scrolls at a pre-selected slow rate, so that a viewer can see what is showing on all of the channels. In the case of satellite broadcasts, the situation becomes even more complex. Digital satellite TV systems may provide 1,000 TV channels with various TV programs and services.

The program schedule information contained in an analog EPG is typically broadcast by an operator on a dedicated one of the channels of the cable TV system. However, most digital EPGs operate in a different way. In a digital EPG, program schedule information and sometimes applications and/or systems software is transmitted to equipment located on the viewer's premises (e.g., a digital set-top box) by way of broadcast, cable, direct satellite or other suitable form of transmission. A digital set-top box ("STB") serves to deliver compressed digital video, data and audio signals in real time usable form to one or more TV sets. The STB, which is basically a dedicated computing device, contains memory allowing the program schedule information to be stored for later viewing. The program schedule information stored in the STB is periodically updated, e.g., on a continuous, daily, weekly, or biweekly basis or any other useful pattern. A microprocessor within the STB utilizes the viewer's TV set to display the stored program schedule information and to implement other functions of the EPG in response to user-generated signals. The functions available to the viewer vary depending on the sophistication of the particular EPG and hardware capabilities.

Digital EPGs are often used in an interactive television system and are sometimes called interactive programming guides ("IPGs"). In an interactive television system EPG, a user may browse schedule information in any order, select programs from on-screen menus for current or future viewing, and order pay-per-view programming on demand. Some (advanced) EPGs permit other functions, e.g., an e-mail function, or a function that permits a user to block certain kinds of programs, such as adult or violent programs, and choose favorite channels. Prior art digital EPGs, however, collectively fail to provide viewing capabilities that realistically address the viewing habits of the users of these systems.

As mentioned above, an analog TV EPG is viewed on a TV screen as a continuously scrolling rectangular table. This solution does not allow any user interaction and is suitable only for the passive television viewer. This is a poor solution for interactive TV, because:

1. The scrolling speed is set upfront (it is not necessarily constant) and cannot be adjusted by user's request.
2. In an analog EPG system, the user cannot switch to the channel of choice immediately from the EPG (e.g., by clicking on a display of a channel number on the EPG). Instead, the user must input the channel number with a remote controller.
3. The analog EPG scrolling table is completely sequential (providing information in an order depending upon channel number and designer's chosen style) and the user cannot pre-sort schedule data or otherwise personalize the EPG.

A more sophisticated solution is the interactive EPG or ("IPG"). Unfortunately existing solutions have their own problems. For example, interactive EPG systems provide drop-down menus that require multiple steps in order to interact with the EPG, which can lead to user frustration when a search for a desired program is unsuccessful or simply too complicated. As known today, interactive EPGs are inflexible in terms of menu design, because the menu itself is a set of regular two-dimensional grids.

Additional problems with the prior art electronic programming guides are listed below.

1. Program Description Truncation. When displaying schedule information in grid format, i.e., columns representing time slots and rows representing channels, program titles are generally truncated to fit into the cells of the grid. The width of a grid cell varies with the program duration. Since a 30-minute program is allotted only a small space for the program title and description, titles and/or descriptions for half- and even full-hour programs often must be truncated to fit in the allotted space. Some systems simply cut off the description of a program without abbreviating it in any way, such that the user cannot determine the subject matter of the program. While some systems partially alleviate this problem by providing two lines of text in each grid cell, this is a less than ideal solution because program descriptions may still be truncated.

2. Inability to Create a Program Itinerary While Viewing a TV Program. Prior art EPGs lack a method for a user to create a program itinerary, electronically, concurrently while the user views a program on the TV screen. Thus, when a user views a program on a particular channel, he or she cannot electronically set up a sequence of other channels to surf.

3. Inability to Simultaneously Channel Surf and View EPG. Prior EPGs leave much guess work for the user as he or she navigates through a sequence of channels. When skimming through channels and trying to determine what program is being displayed on a channel, commonly known as "channel surfing," the user must guess which program is currently being aired from the video segment encountered during channel surfing. Since up to thirty percent of the programming appearing on a channel at any given time is advertising, the user is not provided with any clues as to what program is showing on a selected channel at a given time. Hence, the user often has no choice but to wait until an advertisement or commercial ends before learning what program is showing on the selected channel. Existing solutions allow user to go to the channel and find more information by using a special button of remote control, i.e., "info" button. Thus, a need exists for an EPG that displays current program schedule information for each channel at the same time that the user surfs through the channels.

4. Text Size. Unfortunately, existing EPGs allow for only one font size. However, human beings do not all have the same acuity of vision. As a result, two problems appear: some viewers may have difficulty or even be unable to read the information in the EPG and some viewers want to see more information using smaller font.

5. Specular Highlighting. Existing EPGs provide only a very rudimentary lighting capability. For example, existing EPGs do not have an adequate means to adjust the brightness of the EPG. This detracts from the utility of the EPG.

Thus, methods and apparatus for generating a two-dimensional ("2D") TV graphical user interface ("GUI") for providing TV program guides on a TV screen are known in the art. A conventional TV GUI uses a single layer of on-screen display graphics to present TV program information and, typically, multiple menus are provided to enable users to navigate through the presented information. For example, an apparatus that generates a main menu of a program guide, which includes program source information and program event information for a plurality of program sources, and further generates navigation menus for allowing a viewer to modify the program guide is disclosed in U.S. Pat. No. 5,694,176, issued Dec. 2, 1997 to Bruette et al. A system and a process in which a program listing is displayed as a grid of two-dimensionally arranged adjacent irregular cells, which vary in length corresponding to time duration of the programs, with a title of a program being displayed in each of said irregular cells, said grid having a plurality of channels listed in a first dimension and time listed in a second dimension, is disclosed in U.S. Pat. No. 5,809,204, issued Sep. 15, 1998 to Young.

A multi-layered TV GUI that uses a memory for storing graphics data that is capable of storing two graphics planes that represent upper and lower layers of graphics displayable on a TV screen, and that uses a graphics accelerator to combine the graphics planes to produce various graphical effects on the screen is disclosed in U.S. Pat. No. 6,016,144, issued Jan. 18, 2000 to Blonstein et al. (hereinafter "Blonstein '144"). One advantage of a multi-layered TV GUI that produces multiple layers of graphics on a TV screen is that it eliminates the need for a multi-menu hierarchical system. (A hierarchical menu system often causes confusion when the user loses track of the menu that he or she came from and how to get back.) A variety of other TV GUI are disclosed in the following additional issued patents: U.S. Pat. No. 4,706,121, issued Nov. 10, 1987 to Young (hereinafter "Young '121"); U.S. Pat. No. 5,781,246, issued Jul. 14, 1998 to Alten et al.; U.S. Pat. No. 5,986,650, issued Nov. 16, 1999 to Ellis et al.

In Young '121, the multi-layered TV GUI provides a TV GUI that adjusts graphical presentation in a matrix of text to expose a predetermined portion of a lower layer of graphics. In Blonstein '144, electronic program schedule data is stored in a system memory and, during the rendering process, converted into a set of bit-maps (one bitmap for each single layer) and stored in a graphics accelerator buffer memory. However, while prior art EPGS, such as Young '121 and Blonstein '144 relate generally to graphical displays and in particular to navigation within a 2D graphical display space, they do not approach the advantages of a 3D graphical display.

What is clearly needed is a method and system for cost-effective optimal storing of electronic program schedule data using a combination of on-chip memory and system memory for 3D-enabled EPGs.

SUMMARY OF THE INVENTION

A system that can store electronic program guide information using 3D graphics is disclosed. In a particular embodiment, a data filter and a text-to-image converter are used for converting filtered data into a set of digital images that are defined as a set of texture maps. In order to apply those texture maps, a memory analyzer analyzes the set-top box layout and indicates available memory types. The memory analyzer controls a memory distributor for distributing texture maps into the appropriate types of memory.

In a particular embodiment, the system further comprises a processor coupled to the data filter. The processor executes a first logic in which the total size of the set of texture maps is less than or equal to a memory size. The processor executes a second logic if the total size of the set of texture maps is greater than the memory size, in which case the set of texture maps is divided into at least two groups.

A method according to an embodiment of the invention includes computing a total size of a set of texture maps, comparing the total size of the set of texture maps with a memory size, and then dividing the set of texture maps into at least two groups if the total size of the set of texture maps is larger than the memory size, such that the total size of the texture maps in a first group is the largest possible sum of texture map sizes for which the total size of texture maps in the first group is less than the memory size.

BRIEF DESCRIPTION OF THE DRAWINGS

The present invention is illustrated by way of example, and not limitation, in the figures.

FIG. 1 is a block diagram showing the components of a 3D-enabled electronic device.

FIG. 2 is a block diagram showing a mechanism and apparatus for cost-effective memory management in accordance with the present invention.

DETAILED DESCRIPTION OF THE INVENTION

Accordingly, one advantage of the present invention is in the use of texture map memory for storing electronic program schedule data, thereby saving memory requirements on the system memory for TV set-top boxes.

FIG. 1 shows a memory layout in a 3D-enabled personal computer ("PC") or PC-like architecture. Such architectures have a conventional system memory (A memory), special fast access AGP memory (B Memory), which is mapped together with the system memory, texture mapping memory on the 3D graphics chip (C memory), frame buffer memory (D memory), and z-buffer memory (E memory).

In contrast, a conventional set-top box, which does not use a 3D accelerator and 3D graphics pipeline has only A (or A and D) memory (not shown). In existing set-top boxes, including those having a 3D chip, e.g., for games, B, C, and E memory can not be used, because these types of memory can not be reached without using a 3D graphics pipeline and current EPG software does not use such pipeline.

One advantage of the present invention is that providing a system in which a 3D-enabled EPG uses a 3D graphics pipeline and 3D accelerators, all or part of B, C and E memory can be used. Thus, memory usage is optimized to save storage space and increase overall system performance. Another advantage of the present invention is the reduced memory requirements and power consumption result in lower costs to build and operate the system.

Description of the Hardware

In one embodiment of the present invention, the hardware used to practice the invention includes the following:

1. A CPU such as a Celeron or Pentium, e.g., manufactured by Intel Corporation, or any other similar or equivalent CPU.
2. A non-volatile memory, e.g., a ROM, EPROM, EEPROM, EAROM, hard disk, CD ROM, or other memory device.
3. A second main memory device, typically a RAM or magnetic disk, but in some cases other suitable technologies may be used.
4. A graphics accelerator circuit.

Implementing the Memory Optimization

In accordance with a method of the present invention, the following steps are carried out for implementing the memory optimization:

program-schedule data is filtered by a data filter, the filtered data is converted into a set of digital images by a text-to-image converter, the set of digital images is defined as a set of texture maps, set top box layout is analyzed and available memory types/sizes are defined, based on the memory available and the set of texture maps, a memory distribution algorithm is performed that includes the following steps:

compute the total size of the set of texture maps "St" as the sum of all texture map sizes, compare St with on-chip C-memory size "Sc"

if St is less than or equal to Sc then the set of texture maps is stored in C memory, or if St is greater than Sc then the set of texture maps is divided into two groups "$G_1$" and "$G_2$" depending on an algorithm that is performed that includes the following steps:

analyze the set of texture maps to determine a group $G_1$ such that the total size "$SG_1$" of texture maps in group $G_1$ is the largest possible sum of texture map sizes for which $SG_1$ is less than Sc, compute "$SG_2$" as St-$SG_1$ group $G_1$ is stored in C memory, group $G_2$ is stored in B memory if available, if B memory is not available then all texture maps in group $G_2$ are compressed to fit into C memory.

A data filter, as shown in FIG. 2, is the selection process, typically by a user or other parameters, that chooses the relevant scheduling information out of the bulk of scheduling information available. For example, if the user is interested in "news," all news-related objects will be selected (i.e., filtered).

A memory analyzer, as depicted in FIG. 2, is the process that analyzes what types and how much of each type of available memory is available in the present system. Typically, it will sample for memory availability and size in a non-destructive manner, as to ascertain the actual extent of the available memory. In some cases, it may utilize system resources, for example, from the OS, BIOS, Drivers 3Ddirect, etc.

A memory distributor, as shown in FIG. 2, is the process (or program) that performs the memory optimization algorithm, as described above.

A texture map compression engine, as shown in FIG. 2, is a compression algorithm, such as provided in standard graphics libraries (e.g., *Direct 3D*™, New Riders Publishing, 1997), used to compress the texture maps in accordance with a given software environment.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claims.

What is claimed is:

1. A system comprising:

A first preferred memory of a given size and a second memory;

a data filter coupled to a text-to-image converter for converting filtered data into image data using texture maps; and a processor coupled to the data filter, wherein the processor executes a first logic in which the total size of the set of texture maps is less than or equal to the first memory size; and a second logic if the total size of the set of texture maps is greater than the first memory size, to divide the set of texture maps into two groups and a memory analyzer for analyzing set-top box layout to determine the types and corresponding sizes of at least the first and the second memories available in the set-top box, the memory analyzer being coupled to a memory distributor, wherein the system determines a storage size necessary for storing the texture maps defining one or more images and the memory distributor distributes the texture maps to a preferred first memory if the total size of the texture maps is less than or equal to the available first memory size and further wherein if the total size of the texture maps is greater than the first memory size, the texture maps are divided into two groups where a first group's total size is the largest possible sum of map sizes less than the first memory size and where a second group's total size is the difference between the total size of the set of texture maps and the total size of the first group, wherein the set of texture maps of the first group is stored in the first memory, wherein the set of texture maps of the second group is stored in the second memory, and wherein the set of texture maps of the second group is compressed to fit into the first memory if sufficient second memory is not available to receive the set of texture maps of the second group.

2. The system of claim 1, wherein a total size of the set of texture maps is a sum of all texture map sizes.

3. The system of claim 1, further comprising a compression engine.

4. A method comprising:
computing a total size of a set of texture maps;
searching for types of memories in a set-top box;
comparing the total size of the set of texture maps with a size of a preferred first memory;
dividing the set of texture maps into at least two groups if the total size of the set of texture maps is larger than the first memory size, such that the total size of the texture maps in a first group is the largest possible sum of texture map sizes for which the total size of texture maps is less than the first memory size and the total size of a second group is the difference between the total size of the set of texture maps and the total size of the first group, storing the second group of texture maps in a second memory, and compressing the second group of texture maps to fit into the first memory if sufficient second memory is not available.

5. The method of claim 4 wherein computing a total size of a set of texture maps comprises:
computing a sum of all texture maps.

6. The method of claim 4 further comprising:
storing the set of texture maps in the first memory if the total size of the set of texture maps is less than or equal to the first memory size.

7. The method of claim 4 further comprising:
storing the first group of texture maps in the first memory.

* * * * *